(12) United States Patent
Kuppahally et al.

(10) Patent No.: US 11,789,971 B1
(45) Date of Patent: Oct. 17, 2023

(54) ADDING REPLICAS TO A MULTI-LEADER REPLICA GROUP FOR A DATA SET

(71) Applicant: Amazon Technologies, Inc., Seattle, WA (US)

(72) Inventors: Sharatkumar Nagesh Kuppahally, Issaquah, WA (US); Somasundaram Perianayagam, Seattle, WA (US); Hao He, Seattle, WA (US); James Christopher Sorenson, III, Seattle, WA (US); Akshat Vig, Seattle, WA (US); Oren Yossef, Bellevue, WA (US); Sanjay Shanthakumar, Newark, CA (US); Chase Kernan, Seattle, WA (US); Alexander Richard Keyes, Seattle, WA (US); Akanksha Fouzdar, Sunnyvale, CA (US); Sudhir Konduru, Sunnyvale, CA (US); Arijit Choudhury, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 179 days.

(21) Appl. No.: 16/700,131

(22) Filed: Dec. 2, 2019

(51) Int. Cl.
*G06F 16/27* (2019.01)
*G06F 16/23* (2019.01)
*G06F 11/14* (2006.01)
*G06F 16/22* (2019.01)

(52) U.S. Cl.
CPC .......... *G06F 16/27* (2019.01); *G06F 11/1448* (2013.01); *G06F 16/2282* (2019.01); *G06F 16/2365* (2019.01); *G06F 2201/84* (2013.01)

(58) Field of Classification Search
CPC ....... G06F 16/27; G06F 16/273; G06F 16/275; G06F 16/278; G06F 16/2282; G06F 16/2365; G06F 11/1448; G06F 2201/84; G06F 3/065; G06F 11/1402; G06F 3/0614; G06F 2201/82; G06F 11/2064; G06F 16/2308; G06F 16/2315; G06F 16/2322; G06F 16/2329; G06F 16/2336; G06F 16/2343

See application file for complete search history.

(56) References Cited

U.S. PATENT DOCUMENTS

| | | | |
|---|---|---|---|
| 7,805,407 B1* | 9/2010 | Verbeke et al. ......... | G06F 16/27 707/634 |
| 7,953,710 B2 | 5/2011 | Novik et al. | |
| 9,069,827 B1* | 6/2015 | Rath et al. .......... | G06F 11/2094 |
| 9,170,851 B2 | 10/2015 | Hamano et al. | |
| 9,489,443 B1* | 11/2016 | Muniswamy-Reddy et al. .......... | G06F 16/278 |
| 2004/0148317 A1* | 7/2004 | Sundararajan et al. ..................... | G06F 16/275 |
| 2005/0193024 A1* | 9/2005 | Beyer et al. ........... | G06F 16/20 |
| 2005/0193037 A1* | 9/2005 | Adiba et al. ........ | G06F 11/1479 |
| 2006/0031266 A1* | 2/2006 | Colbeck et al. .... | G06F 16/1844 |
| 2007/0299887 A1* | 12/2007 | Novik et al. ......... | G06F 16/273 |
| 2009/0037553 A1* | 2/2009 | Yuan et al. ............ | G06F 16/27 709/209 |

(Continued)

*Primary Examiner* — Vaishali Shah
(74) *Attorney, Agent, or Firm* — S. Scott Foster; Kowert, Hood, Munyon, Rankin & Goetzel, P.C.

(57) ABSTRACT

Replicas may be added to a multi-leader replica group for a data set. A new replica may be added to a group of replicas by copying a version of the data set according to a point in time to the new replica. As updates may occur at different ones of the replicas when the new replica is added, updates that occurred at a source replica for the snapshot and other replicas may be replicated by the different replicas according to the point in time at which the snapshot is created without blocking updates at any of the replicas in the replica group.

20 Claims, 10 Drawing Sheets

(56) References Cited

U.S. PATENT DOCUMENTS

| | | | | |
|---|---|---|---|---|
| 2009/0083441 | A1* | 3/2009 | Clark et al. | G06N 5/02 |
| | | | | 709/248 |
| 2012/0271797 | A1* | 10/2012 | Patil | G06F 16/1824 |
| | | | | 707/639 |
| 2015/0066857 | A1* | 3/2015 | Dayal et al. | G06F 16/128 |
| | | | | 707/639 |
| 2016/0371156 | A1 | 12/2016 | Merriman | |
| 2017/0039261 | A1* | 2/2017 | Bourbonnais et al. | |
| | | | | G06F 11/1464 |
| 2017/0286517 | A1* | 10/2017 | Horowitz et al. | G06F 11/3006 |
| 2018/0341691 | A1* | 11/2018 | Ekbom | G06F 16/178 |
| 2019/0171650 | A1* | 6/2019 | Botev et al. | G06F 16/273 |
| 2019/0325055 | A1* | 10/2019 | Lee et al. | G06F 16/1734 |
| 2019/0332499 | A1* | 10/2019 | Huang et al. | G06F 3/0659 |
| 2020/0401315 | A1* | 12/2020 | Chen et al. | G06F 3/0683 |

* cited by examiner

US 11,789,971 B1

ADDING REPLICAS TO A MULTI-LEADER REPLICA GROUP FOR A DATA SET

BACKGROUND

To expand the availability and performance of applications, data sets that support applications, such as databases, may be replicated across multiple different locations. These locations may be independently managed or otherwise led at the different locations, in order to allow for different instances of the application at the different locations to operate independently. For example, instead of implementing a centralized data store backend for an application that is accessed in diverse geographical regions, an application front end and replica of the backend data store can be implemented in each geographical region. In this way, reads or updates to the backend data store can be quickly performed in the respective regions and then replicated to other regions. Therefore, techniques that increase the capability to configure multiple different locations for data set replicas are highly desirable.

Figure 1:
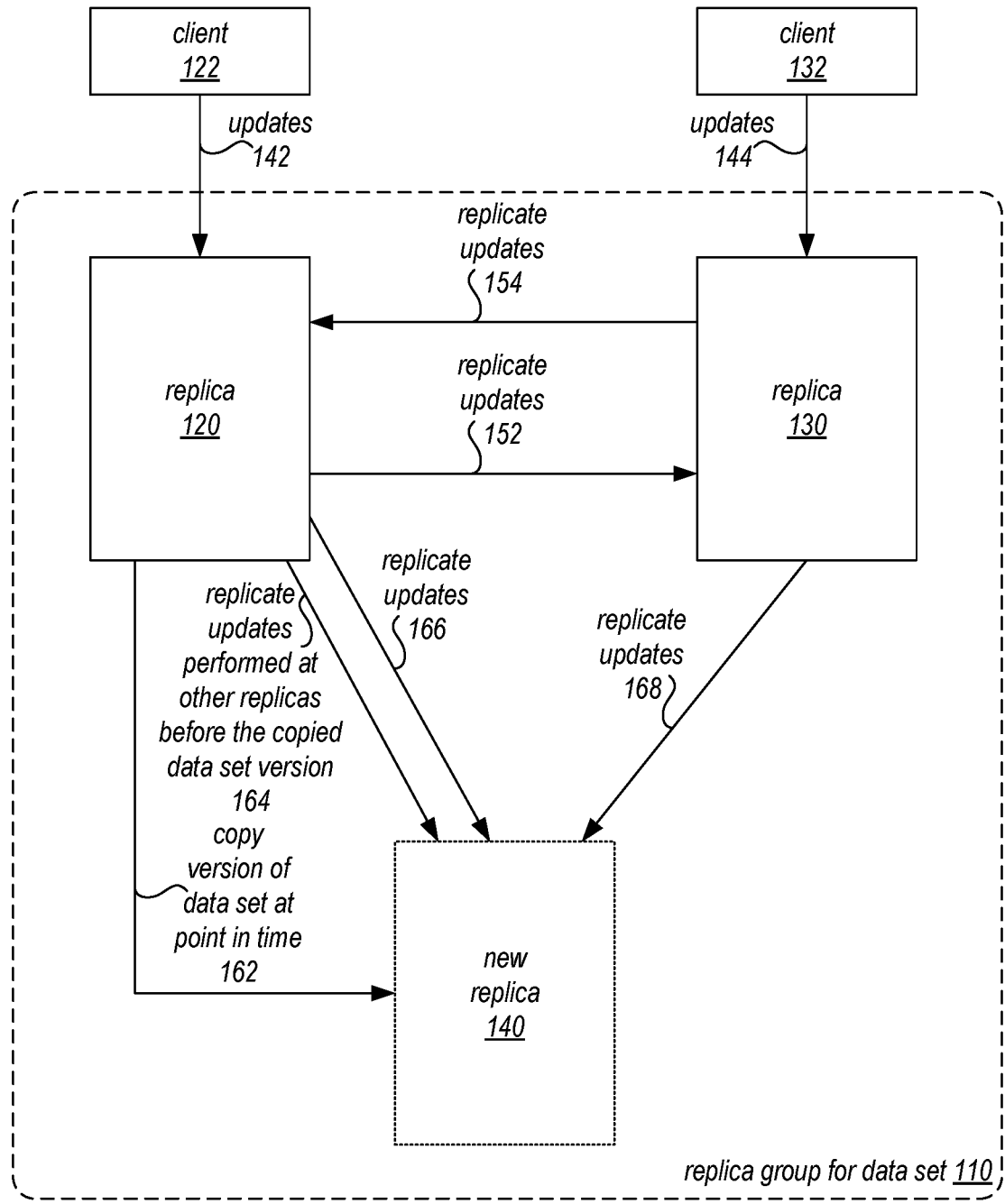
FIG. 1 is a logical block diagram illustrating adding replicas to a multi-leader replica group for a data set, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various techniques for adding replicas to a multi-leader replica group for a data set are described herein. Data sets, such as database tables, collections of data objects, data structures, or other data sets may be stored in a replica group, in various embodiments. A replica group may provide multiple storage locations with separately accessible replicas of a data set that can be accessed to perform various client application requests, in some embodiments. Because multiple replicas of the data set are available, this increases the capability of an application that relies upon the data set to handle failures of one (or more replicas of the data set), in various embodiments. Moreover, the distance between replicas of the data set and the client applications that utilize the data set can be decreased, leading to faster client application performance (as the latency for accessing the data set may be reduced), embodiments.

Conflicts between requests at different locations in the replica group can be resolved, according to various techniques. In this way, client applications can operate independently with respect to the replicas of the data set. For instance, a client application can modify data in the data set in one location and rely upon a conflict resolution mechanism implemented amongst the locations of the replica for the data set in order to determine the success or failure of the modification (without imposing conflict resolution upon a client application).

As the needs of client applications change, it may be beneficial for the membership of the replica group to make corresponding changes. For instance, new locations may be added for a data set in order to make the data set more available (e.g., to add a client application also implemented in the same location). Because in a multi-leader replica group there may not be one replica through which all updates pass through (as each leader or member may be performing updates independently), techniques for adding replicas to a multi-leader replica group may be implemented in order to prevent updates from being missed when adding a replica to the multi-leader replica group while keeping the data set online and available (e.g., at the current replicas of the multi-leader replica group), in some embodiments.

FIG. 1 is a logical block diagram illustrating adding replicas to a multi-leader replica group for a data set, according to some embodiments. Replica group 110 for a data set 110 may implement two or more replicas of the data set, in various embodiments. For example, replica 120 and replica 130 may both be replicas of the data set. A replica of a data set may be a separate and independently accessible replica of the data set, in various embodiments. For example, replica 120 may be a database that stores a copy of the data set. A replica may be implemented across more than one host, server, node, or other computing device (e.g., computing system 1000 in FIG. 10). For example, replica 120 may be a distributed database that stores different partitions of the database across different storage nodes as discussed below with regard to FIGS. 2 - 4. In some embodiments, within a replica multiple copies of the data set may be stored. For instance, replica 120 may include a leader or primary storage node and one or more follower or secondary storage nodes that replicate updates performed at the primary storage node.

In these and other embodiments where a replica includes multiple copies and/or otherwise distributes the data set, updates may be performed within the replica through a single leader or writer (e.g., a single primary storage node or request router as discussed below) so that replication techniques within a replica can based on a single leader or writer model (e.g., synchronous updates that provide read-after-write consistency (sometimes referred to as strong consistency), where a response to a read request may be returned with the most up-to-date data, reflecting the updates from all prior write operations that were successful). In other embodiments, replicas of replica group 110, such as replicas 120 and 130, may be a single storage host, server, node or computing device.

As illustrated in FIG. 1, client 122 may request updates 142 (e.g., to modify data, insert data, or delete data) to a data set. These updates 142 may be performed independently from updates 144 that are requested by client 132 at replica 130. Instead, replica group 110 may implement a scheme to resolve conflicts between the updates. For example, in some embodiments, replica group 110 may implement a last write wins scheme (as discussed below with regard to FIG. 3). In this way, replica group 110 for a data set may maintain the data set according to eventually consistency, where eventually requests to read an item in the data set may return the last updated value, in some embodiments. Thus, replica 120 may replicate 152 updates received updates 142 to replica 130 and replica 130 may replicate 154 received updates 144 to replica 120, in some embodiments. Various protocols for replicating the updates may be implemented, such as direct writes to storage locations to perform the updates, or as discussed below with regard to FIG. 4, the updates may be replicated to the replica to handle (e.g., to a request router) in order to determine whether the update should be applied.

As discussed above, a new replica 140 may be added to increase the availability of the data set and/or provide a replica close to client applications that will provide better performance for the client applications than replicas 120 and 130. In various embodiments new replica 140 may be added without blocking or preventing updates at replicas 120 and 130 while being added. In various embodiments, new replica 140 may be added without losing or dropping updates performed at replicas 120 and 130. For example, a version (e.g., a snapshot) of the data set may be created and copied 162 to the new replica, in some embodiments. This version may be associated with a point in time (e.g., a timestamp, version number, vector clock, etc.), in some embodiments. The version may be created from one of the replicas as the source replica (e.g., replica 130 in FIG. 1).

In order to ensure that new replica 140 can also provide an eventually consistent version of the data set, other updates not included in the copied version may be replicated. For example, replica 120 may replicate other updates 166 performed at other replicas before the copied version of the data set 164 that were sent to replica 120 but not included in the version copied to new replica 140, as well as updates 166 that were received after the point in time from client 122, as discussed in detail below with regard to FIG. 6. Replica 130 may also replicate updates 168, which may include replicating updates that were received after the point in time for the version of the data set copied to new replica 140 (as replica 120 will have either copied updates prior to the point in time in the snapshot or as part of update replication 164).

Please note that previous descriptions of implementing adding replicas to a multi-leader replica group for a data set are not intended to be limiting, but are merely provided as logical examples. For example, these techniques may be implemented for expanding from a single replica to two (or more replicas). These techniques could be implemented in parallel for adding multiple new replicas. More existing replicas may be already created, in some embodiments. Additionally various techniques for determining the point in time and which replica should replicate which changes, as discussed below with regard to FIGS. 5 - 9, may be implemented, in some embodiments.

This specification begins with a general description of provider network regions that may implement different locations for services, such as a database service, that may implement adding replicas to a multi-leader replica group for a data set. Then various examples of a database service are discussed, including different components/modules, or arrangements of components/module, that may be employed as part of implementing the database service, in one embodiment. A number of different methods and techniques to implement adding replicas to a multi-leader replica group for a data set are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
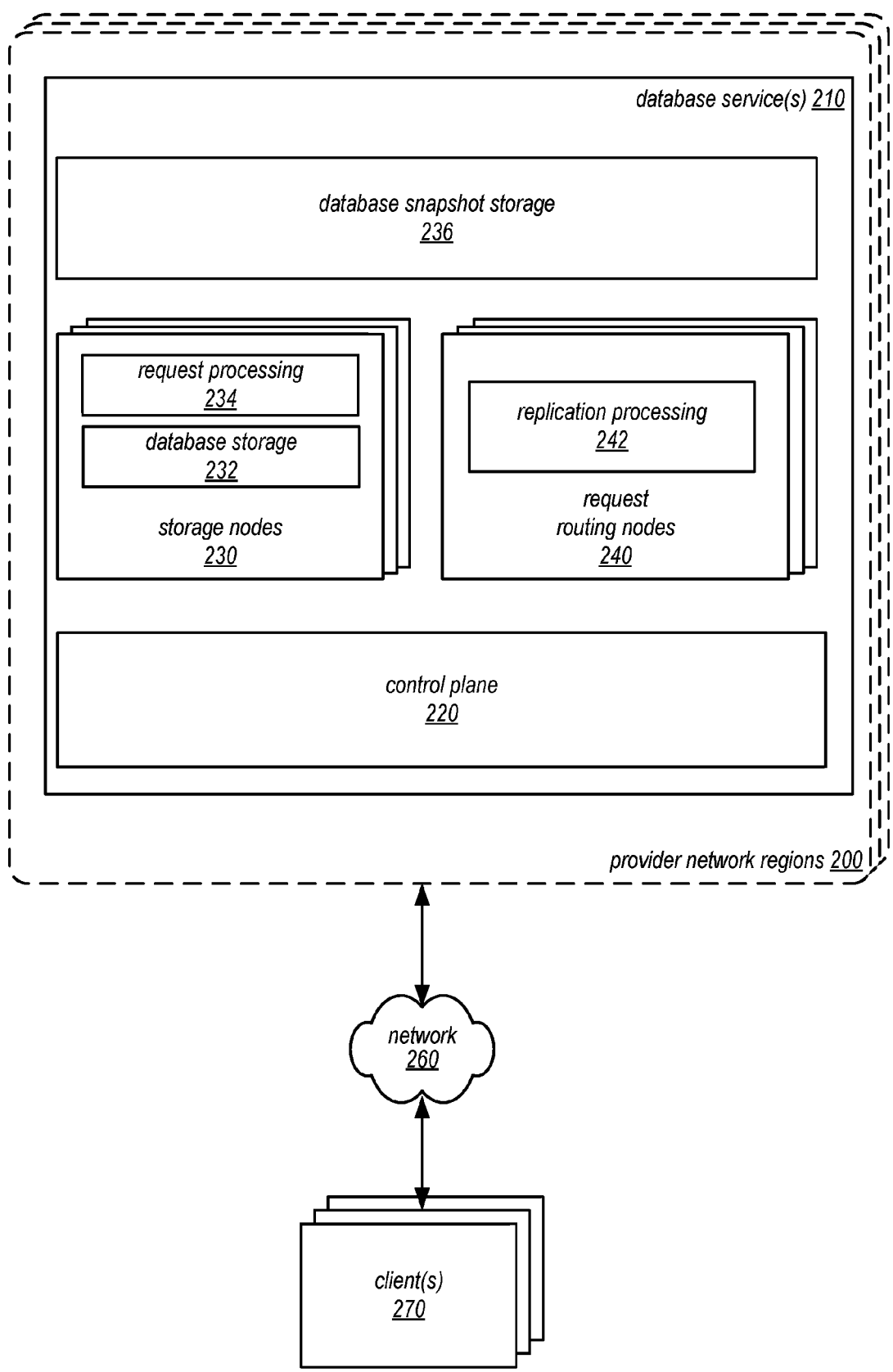
FIG. 2 is a logical block diagram illustrating provider network regions that implement a database service that may implement adding replicas to a multi-leader replica group for a data set, according to some embodiments.

FIG. 2 is a logical block diagram illustrating provider network regions that implement a database service that may implement adding replicas to a multi-leader replica group for a data set, according to some embodiments. A provider network may be a private or closed system, in one embodiment, or may be set up by an entity such as a company or a public sector organization to provide one or more services (such as various types of cloud-based storage) accessible via the Internet and/or other networks to clients 250, in another embodiment. A provider network may be a network-based or cloud provider network (sometimes referred to simply as a "cloud"), which may provide a large pool of network-accessible computing resources (such as compute, storage, and networking resources, applications, and services), which may be virtualized or bare-metal. A provider network can provide convenient, on-demand network access to a shared pool of configurable computing resources that can be programmatically provisioned and released in response to customer commands. These resources can be dynamically provisioned and reconfigured to adjust to variable load. A provider network therefore can thus be considered as both the applications delivered as services over a publicly accessible network (e.g., the Internet, a cellular communication network) and the hardware and software in provider network data centers that provide those services.

In one embodiment, a provider network may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network. In some embodiments, a provider network can be formed as a number of regions, such as provider network regions 200, where a region is a geographical area in which the cloud provider clusters data centers. Each region can include two or more fault tolerance zones (which are also referred to as zones, availability zones, or availability domains and are not illustrated in FIG. 2) connected to one another via a private high speed network, for example a fiber communication connection. A fault tolerance zone may refer to an isolated failure domain including one or more data center facilities with separate power, separate networking, and separate cooling from those in another fault tolerance zone. Preferably, a fault tolerance zone within a region are positioned far enough away from one other that the same natural disaster should not take more than one fault tolerance zone offline at the same time. Customers can connect to a fault tolerance zone of the provider network via a publicly accessible network (e.g., the Internet, a cellular communication network).

In one embodiment, provider network regions 200 may implement various computing resources or services, such as database service(s) 210 (e.g., relational or non-relational (e.g., NoSQL) database query engines), and other services (not illustrated), such as a map reduce service, data warehouse service, data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in one embodiment, each of which may be similar to the computer system embodiment illustrated in FIG. 10 and described below. In one embodiment, the functionality of a given system or service component (e.g., a component of database service(s) 210) may be implemented by a particular node or may be distributed across several nodes. In some embodiments, a given node may implement the functionality of more than one service system component (e.g., more than one data store component).

Database service(s) 210 may include various types of database services, in one embodiment, (both relational and non-relational) for storing, querying, and updating data. Such services may be enterprise-class database systems that are highly scalable and extensible. In one embodiment, queries may be directed to a database in database service(s) 210 that is distributed across multiple physical resources, and the database system may be scaled up or down on an as needed basis. The database system may work effectively with database schemas of various types and/or organizations, in different embodiments. In one embodiment, clients/subscribers may submit queries in a number of ways, e.g., interactively via a SQL interface to the database system. In other embodiments, external applications and programs may submit queries using Open Database Connectivity (ODBC) and/or Java Database Connectivity (JDBC) driver interfaces to the database system. In one embodiment, database service(s) 210 may provide a RESTful programmatic interface in order to submit access requests (e.g., to get, insert, delete, or query data). In one embodiment, database service(s) 210 may also be any of various types of data processing services that implement or allow transactions.

In one embodiment, clients 250 may encompass any type of client configurable to submit network-based requests to provider network region 200 via network 260, including requests for database service(s) 210 (e.g., to request to add a replica group for a table stored in database service(s) 210 in another provider network region 200). For example, in one embodiment a given client 250 may include a suitable version of a web browser, or may include a plug-in module or other type of code module that executes as an extension to or within an execution environment provided by a web browser. Alternatively in a different embodiment, a client 250 may encompass an application such as a database client/application (or user interface thereof), a media application, an office application or any other application that may make use of a database in database service(s) 210 to store and/or access the data. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that interacts directly with provider network 200, in one embodiment. In one embodiment, client 250 may generate network-based services requests according to a Representational State Transfer (REST)-style network-based services architecture, a document- or message-based network-based services architecture, or another suitable network-based services architecture. Note that in some embodiments, clients of database service(s) 210 (e.g., to perform updates may be implemented within provider network regions 200 (e.g., applications hosted on a virtual compute service).

In one embodiment, a client 250 may provide access to provider network regions 200 to other applications in a manner that is transparent to those applications. For example, client 250 may integrate with a database on database service(s) 210. In such an embodiment, applications may not need to be modified to make use of the storage system service model. Instead, the details of interfacing to the database service(s) 210 may be coordinated by client 250.

Client(s) 250 may convey network-based services requests to and receive responses from provider network regions 200 via network 260, in one embodiment. In one embodiment, network 260 may encompass any suitable combination of networking hardware and protocols necessary to establish network-based-based communications between clients 250 and provider network region 200. For example, network 260 may encompass the various telecommunications networks and service providers that collectively implement the Internet. In one embodiment, network 260 may also include private networks such as local area networks (LANs) or wide area networks (WANs) as well as public or private wireless networks. For example, both a given client 250 and provider network region 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 250 and the Internet as well as between the Internet and provider network region 200. It is noted that in one embodiment, client(s) 250 may communicate with provider network region 200 using a private network rather than the public Internet.

Figure 3:
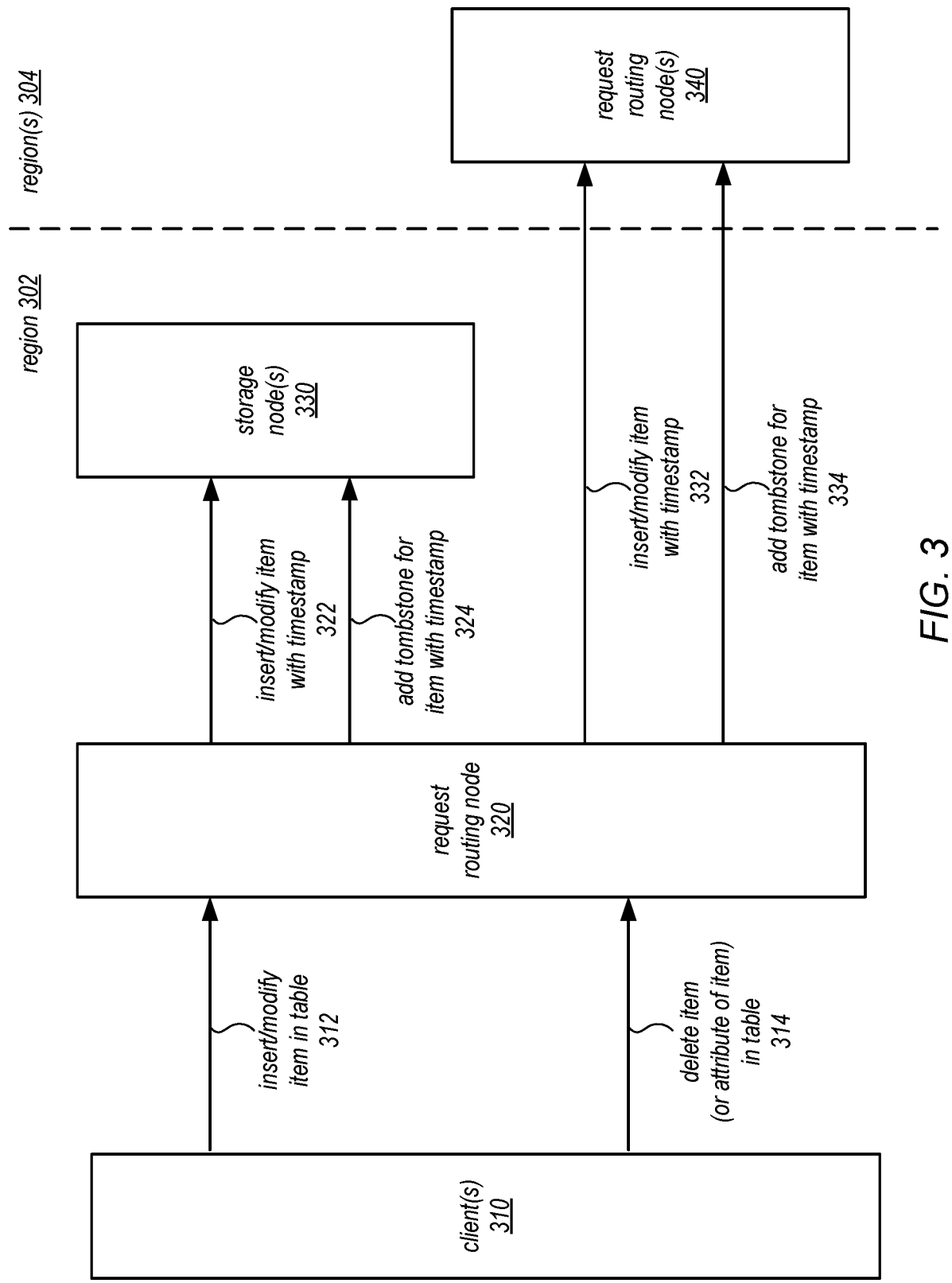
FIG. 3 is a logical block diagram illustrating a replication protocol for different client requests for a database table in a replica group across different provider network regions, according to some embodiments.
Figure 4:
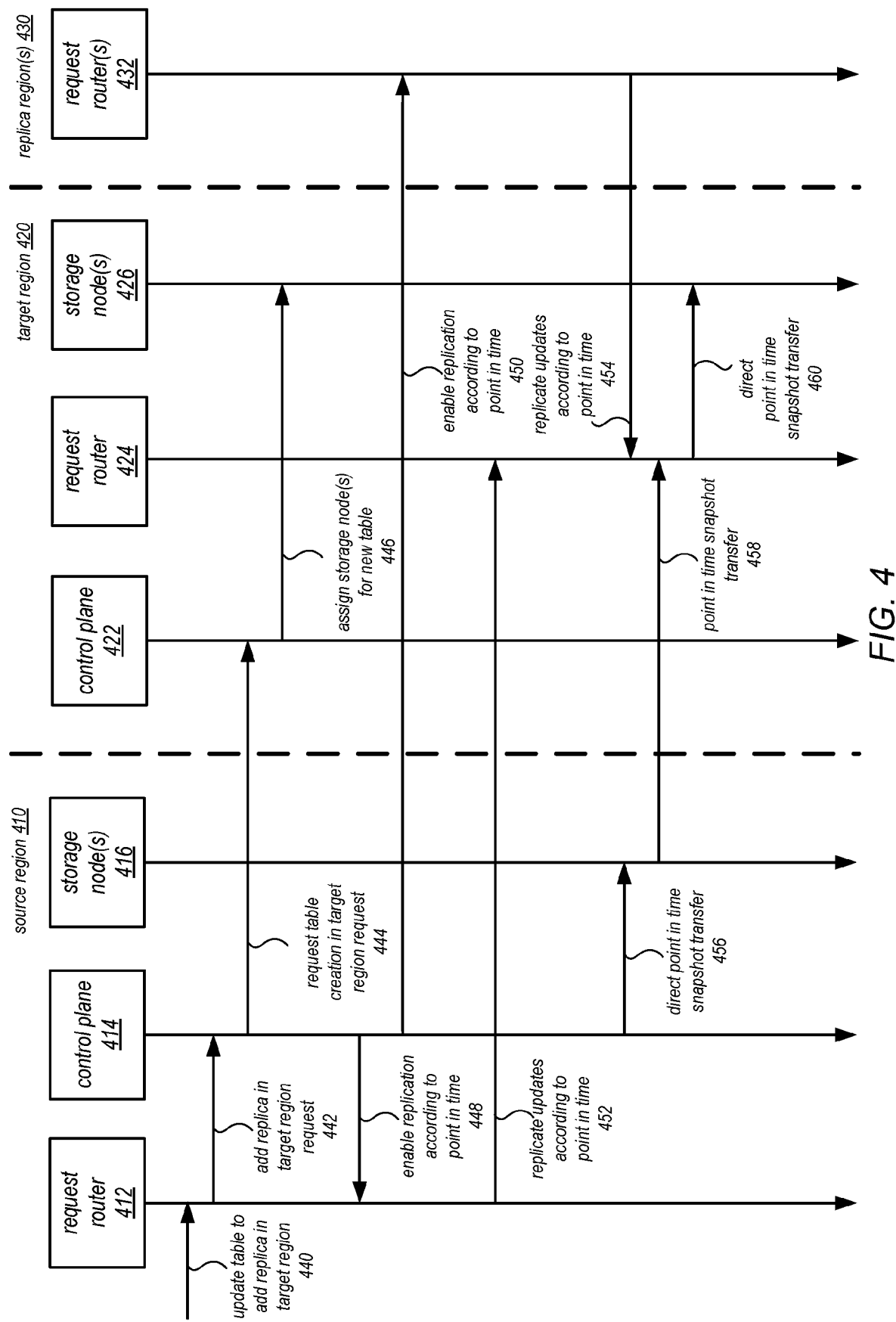
FIG. 4 is a sequence diagram illustrating interactions to add a replica to a replica group, according to some embodiments.

Database service 210 may implement request routing nodes 250, in one embodiment. Request routing nodes 250 may receive, authenticate, parse, throttle and/or dispatch service or other access requests, including requests to read from or write or otherwise modify data in a hosted database (e.g., at a specified table) among other things, in one embodiment. For example, FIGS. 3 and 4 illustrate requests handled by a request router to update a table. Request routing nodes 240 may implement replication processing 242 to replicate updates to a table to other replicas of the table in a replica group for the table (which may be in another provider network region).

In one embodiment, request routing nodes 240 may support handling requests formatted according to an interface to support different types of web services requests. For example, in one embodiments, database service 210 may implement a particular web services application programming interface (API) that supports a variety of operations on tables (or other data objects) that are maintained and managed on behalf of clients/users by the data storage service system (and/or data stored in those tables). In one embodiment, database service 210 may support different types of services requests. For example, in one embodiments, database service 210 may implement a particular web services application programming interface (API) that supports a variety of operations on tables (or other data objects) that are maintained and managed on behalf of clients/users by the data storage service system (and/or data stored in those tables), such as a request to perform a transaction that includes operations (e.g., requests to read, write, update, delete, add, or insert items in a table) with respect to one or multiple items across one or multiple partitions of a table hosted at one or multiple storage nodes (which may be storage nodes 230). Similarly, a request may be a request to perform operations on individual items (e.g., requests to read, write, update, delete, add, or insert items in a table, according to a specified consistency level or characteristic). In one embodiment, request routing nodes 240 may perform parsing and/or throttling of service requests, authentication and/or metering of service requests, dispatching service requests, and/or maintaining partition assignments that map storage nodes to partitions of tables hosted in database service(s) 210.

In one embodiment, database service 210 may implement control plane 220 to implement one or more administrative components, such as automated admin instances which may provide a variety of visibility and/or control functions). Control plane 220 may provide visibility and control to system administrators, detect split events for partitions of tables at storage nodes, and/or anomaly control, resource allocation, in one embodiment. In one embodiment, control plane 220 may also include an admin console, through which system administrators may interact with database service 210 (and/or the underlying system). In one embodiment, the admin console may be the primary point of visibility and control for database service 210 (e.g., for configuration or reconfiguration of tables by system administrators). For example, the admin console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as split requests to be processed, at database service 210, in one embodiment.

Control plane 220 may direct the performance of different types of control plane operations among the nodes, systems, or devices implementing database service 210, in one embodiment. For instance, control plane 220 may communicate with storage nodes 230 to initiate the performance of various control plane operations, such as moves, splits, update tables, delete tables, create indexes, as well as the addition of a new replica to a replica group for a database (or table), as discussed below with regard to FIG. 4.

In one embodiment, database service 210 may also implement a plurality of storage nodes 230, each of which may manage one or more partitions of a database table on behalf of clients/users or on behalf of database service 210 which may be stored in database storage 232 (on storage devices attached to storage nodes 230 or in network storage accessible to storage nodes 230).

Storage nodes 230 may also implement request processing 234, in some embodiments. Request processing 234 may create, update, define, query, and/or otherwise administer databases, in one embodiment. For instance, request processing 234 may maintain a database according to a database model (e.g., a relational or non-relational database model). In one embodiment, request processing 234 may allow a client to manage data definitions (e.g., Data Definition Language (DDL) requests to describe column definitions, requests to add item attributes, etc.). In one embodiment, request processing 234 may handle requests to access the data (e.g., to perform transactions, to insert, modify, add, or delete data, and requests to read data for data by generating execution plans to determine which partitions of a database may need to be evaluated or searched in order to service the read request). In one embodiment, request processing 234 may also perform other management functions, such as enforcing access controls or permissions, concurrency control, or recovery operations.

In one embodiment, database service 210 may provide functionality for creating, accessing, and/or managing tables at nodes within a single-tenant environment than those that provide functionality for creating, accessing, and/or managing tables maintained in nodes within a multi-tenant environment. In another embodiment, functionality to support both multi-tenant and single-tenant environments may be included in any or all of the components illustrated in FIG. 2. Note also that in one embodiment, one or more storage nodes 230 process access requests on behalf of clients directed to tables. Some of these processing nodes may operate as if they were in a multi-tenant environment, and others may operate as if they were in a single-tenant environment. In some embodiments, storage nodes 230 that operate as in a multi-tenant environment may be implemented on different processing nodes (or on different virtual machines executing on a single host) than processing nodes that operate as in a single-tenant environment.

Different models, schemas or formats for storing data for database tables in database service 210 may be implemented, in some embodiments. For example, in some embodiments, a relational data model that stores database tables structured as rows with fields for a defined number of columns may be implemented. In some embodiments, non-relational (e.g., NoSQL), key-value, or semi structured data may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more key (or key)-value pairs, in any order, in some embodiments. In some embodiments, each attribute in an item may have a name, a type, and a value.

In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the database service 210 (and the underlying storage system) may have no pre-defined schema other than their reliance on the primary key, in some embodiments.

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 210 (and/or the underlying system) may be used to manipulate table-level entities, such as tables and indexes and/or to reconfigure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes (e.g., by modifying the amount of throughput capacity, adding storage capacity for additional read replicas, splitting partitions or moving partitions), and/or describe tables or secondary indexes. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 210 (and/or the underlying system) may be used to perform item-level operations, such as transactions, storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: add a replica, perform a transaction (inclusive of one or more operations on one or more items in one or more tables), put (or store) an item, get (or retrieve) one or more items having a specified primary key, delete an item, update or otherwise modify the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database service 210 (and/or underlying system) described herein may provide various data plane APIs for performing item-level operations, such as a TransactItems API, PutItem API, a GetItem (or GetItems) API, a DeleteItem API, and/or an ModifyItem API, and/or an UpdateItem API, as well as one or more index-based seek/traversal operations across multiple items in a table, such as a Query API and/or a Scan API.

Database service 210 may implement database snapshot storage 236, in some embodiments, which may store created copies of a table or other portion of a database associated with different points in time (which may then be used to perform add a replica to a replica group as discussed below with regard to FIG. 4.

As discussed above with regard to FIG. 1, a replica group can be implemented for different replicas of a data set. In various embodiments, database service 210 may implement a replica group across different provider network regions 200. For example, a database table may be created and hosted in region A and another database table that is a replica may be created and hosted in region B. In some embodiments, a table that is the data set of a replica group across provider network regions may be referred to as a "global table". In order to maintain eventual consistency within the replica group and resolve conflicts (as different client applications may update the different replicas in the different regions differently), a replication protocol may be implemented, in various embodiments. FIG. 3 is a logical block diagram illustrating a replication protocol for different client requests for a database table in a replica group across different provider network regions, according to some embodiments.

Client(s) 310 (which may be similar to clients 250 in FIG. 2), may submit various types of requests for a database table hosted in database service 210. These request may include requests to read database table items (not illustrated), which may not involve the replication protocol, as well as requests to update the database table, which may involve the replication protocol. For example, a request to insert a new item (or attribute of an item) or modify an existing item (such as by adding, removing or changing an attribute or attribute value of an item) in a table 312 may be received at a request routing node 320 for the table, in some embodiments. Similarly, a request to delete an item (or attribute of an item) in a table 314 may be received at request routing node 320.

Request routing node 320 may implement the replication protocol when performing requests within the local region, region 302, and to replicate requests to other regions, such as regions 304. For example, request routing node 320 may perform requests to insert or modify the item 322 at storage node(s) 330. In some embodiments, the insert or modify item may include a timestamp generated by request routing node in order to enforce a last write wins conflict resolution scheme at storage node(s). Thus, if the insert or modification has a timestamp that is earlier than a timestamp value for the item in the table, then that insert or modification would have already been "overwritten" by the action that cause the later timestamp, and thus storage node(s) 330 may drop, ignore, or return an indication that the insert or modify did not succeed. A success acknowledgment may be returned if the insert or write does succeed.

As a last write wins conflict scheme may allow for deleted items or attributes to become written again, an indication (e.g., a tombstone) of the deletion of the item (or item's attribute) may be stored instead of actually deleting the item (although a cleanup process may remove items with a tombstone after a period of time). For example, delete item request 314 may be performed by request routing node 320 as a request to add a tombstone to the item with a timestamp 324. Similar to the timestamp discussed above, a timestamp for a delete action may indicate whether or not the delete is performed. In some embodiments, a separate data structure (e.g., a separate tombstone index) may be implemented for storing tombstones, while in other embodiments, the tombstone may be include as an attribute for an item.

Request routing node 320 may also replicate updates to replicas of the database table in other regions. For example, request routing node 320 may send a request 332 to insert or modify the item with the timestamp generated by request routing node 320 to request routing node 340. Similarly, request routing node 320 may send a request 334 to add a tombstone for the item with the timestamp generated by request routing node 320 to request routing node 340. Request routing node(s) 340 may then forward the requests to the appropriate storage nodes in regions 304 (not illustrated), which may perform or not perform the request according to a last write wins conflict analysis.

In some embodiments, a replication or update streaming service may be implemented separate from request routers, such as request routing node 320. In this way, one or more nodes of the replica or update streaming service may be responsible for obtaining updates from request routing node and sending the requests to another location, such as region(s) 304 (which may also implement a replication service to accept the updates and provide them to request routing nodes 340). Therefore, in at least some embodiments, one or more systems, nodes, or services not illustrated in FIG. 3 (or in replicating updates as discussed below in FIG. 4) may be involved in sending or receiving updates between request routing nodes, and thus the illustrations of replication discussed above with regard to FIG. 3 and below with regard to FIG. 4 are not intended to be limiting as to other replication techniques or protocols. In some embodiments, sending requests to another region may include sending requests from a private network through a public network, such as wide area network like the Internet, to another private network for the region. In some embodiments, a private network connection or link may facilitate communications between regions.

To add a replica of a database table to participate in the replication techniques discussed above, a request to identify, enable, or add a replica of a database table to be a part of a replica group may implemented. For instance, a request to create a replica group (where no previous database tables exists) may be received that creates multiple database tables (which may be initially empty or created from a same database snapshot) in different provider network regions in response to the one request, enabling replication of updates according to the replication protocol discussed. In some embodiments, a request to add a table to make a replica group (to one existing table) may be received. For a replica group with multiple existing replicas, techniques similar to those discussed above with regard to FIG. 1, and below with regard to FIGS. 4 - 9, may be implemented. FIG. 4 is a sequence diagram illustrating interactions to add a replica to a replica group, according to some embodiments.

A replica group for a database table may be implemented in source region 410 and replica region(s) 430, in some embodiments (e.g., storage nodes 416 may store a database table across one or more partitions and perform requests to the database table from source region 410 and other storage nodes (not illustrated) in replica region(s) 430 may perform requests to the database table in replica region(s) 430). An update request may be supported in some embodiments, like update request 440, which may identify a database table to add a replica for in a target region, such as target region 420. Request router 412 may forward the request to control plane 414 (for the provider network region of the database service), which may begin an add replica workflow or other process for coordinating the addition of the database table to the replica group in target region 420. For example, control plane 414 may send a request for table creation in the target region 444 to control plane 422 in target region 420.

Control plane 422 may then assign one (or more) storage node(s) 426 for the new table 446, to ready the storage nodes to store the replica of the database table. Control plane 414 may determine a point in time for creating a version of database table (e.g., selecting and/or generating a database snapshot). Control plane 414 may also coordinate the replication of updates not included in the snapshot copied to storage node(s) 426. For example, control plane 414 may enable replication according to the point in time 448 from request router 412 in source region 410 and enable replication according to the point in time at request router(s) 450 in replica region(s) 430. In this way, request router 412 may replicate updates 452 that were not included in the snapshot, both that occurred after the point in time at request router 412 in source region 410 and in replica regions 430 prior to the point in time but were not received and included in the snapshot. Request router(s) 432 may then replicate the updates according to the point in time 454, for updates that occurred after the point in time to request router 424 to perform to storage node(s) 426.

Control plane 414 may also direct a point in time snapshot transfer 456. For example storage node(s) 416 may transfer 458 some or all of the snapshot to request router 424, which may then direct the point in time transfer 460 to storage nodes 426, either generating the snapshot or providing changes described in a log of changes that occur up to the point in time of the snapshot. A base copy of the snapshot to which the changes are applied may be retrieved from snapshot storage 236 (not illustrated). Various techniques for generating the snapshot (including removing or ignoring tombstones as discussed below with regard to FIGS. 5 - 9) may be performed.

Figure 5:
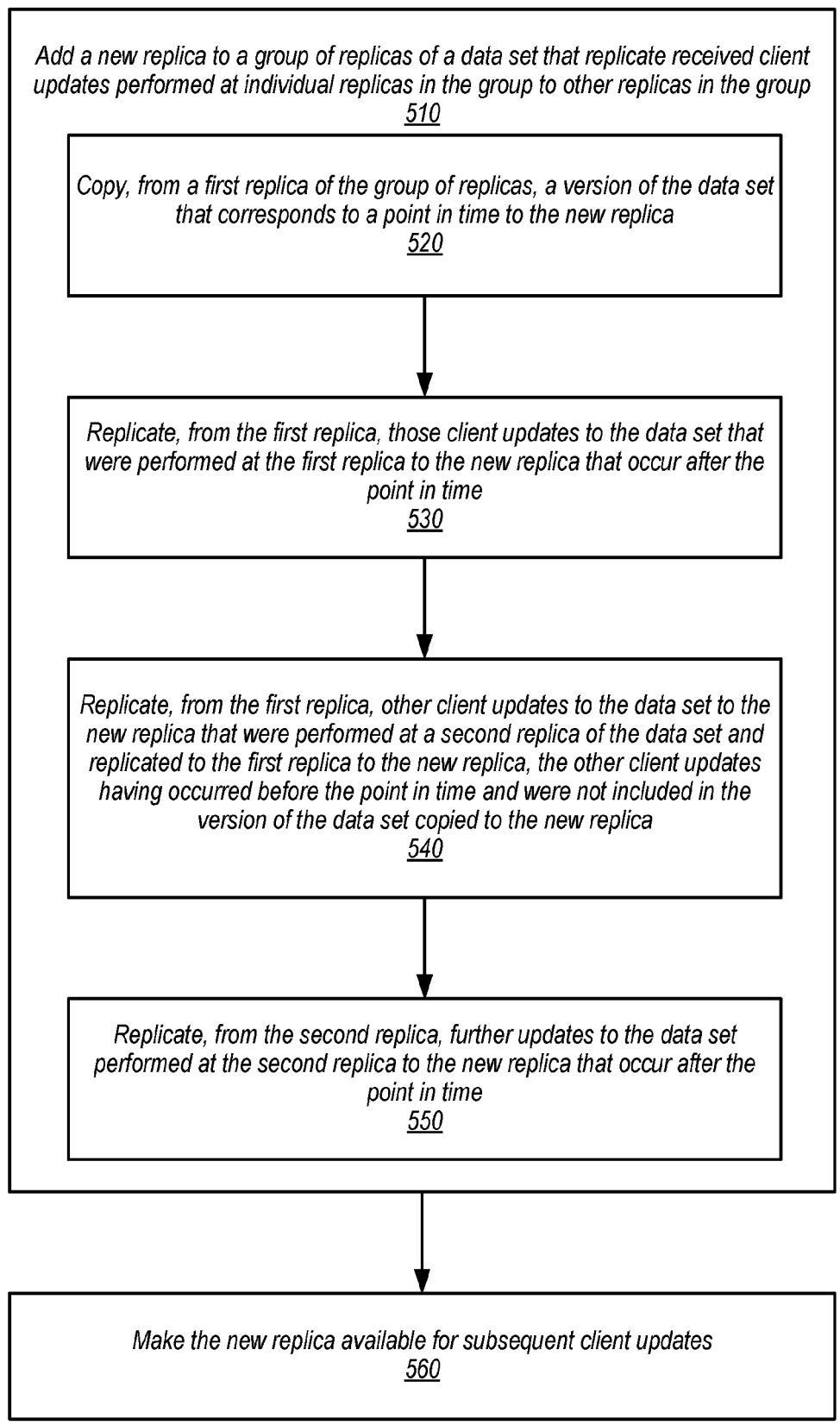
FIG. 5 is a high-level flowchart illustrating various methods and techniques to implement adding replicas to a multi-leader replica group for a data set, according to some embodiments.

The examples of a database service that implements adding replicas to a multi-leader replica group for a data set as discussed in FIGS. 2 - 4 above have been given in regard to a database service (e.g., a non-relational or NoSQL database service or a relational database service) implemented in different regions. However, various other types of data access, management, or control systems or data processing systems may implements a distributed data set or replica group for data sets and thus may implement adding replicas to a multi-leader replica group for a data set, in other embodiments. FIG. 5 is a high-level flowchart illustrating various methods and techniques to implement adding replicas to a multi-leader replica group for a data set, according to some embodiments. These techniques, as well as the techniques discussed with regard to FIGS. 6-9, may be implemented using components or systems as described above with regard to FIGS. 2 - 4, as well as other types of databases, data stores, or systems, and thus the following discussion is not intended to be limiting as to the other types of systems that may implement the described techniques.

As indicated at 510, a new replica may be added to a group of replicas of a data set that replicate received client updates performed at individual replicas in the group to other replicas in the group, in various embodiments. For instance, the new replica may be added in response to a request to add the new replica (e.g., received via an API to add the replica). In some embodiments, the replica may be added in response to detecting an event to add the replica according to one or more criteria for auto-scaling or automated feature to increase availability or durability of a data set by adding the replica (e.g., in response to crossing a data set size threshold, write load threshold on replicas, or as part of provisioning or launching an application or new location). In some embodiments, multiple replicas may be added at the same or partially overlapping times. In some embodiments, a limit on the number of replicas that can be added may be evaluated before allowing a request to add a replica to proceed.

As indicated at 520, as part of adding the new replica, a version of the data set that corresponds to a point in time may be copied from a first replica of the group of replicas to the new replica. In some embodiments, the first replica may be specified in the request, and in other embodiments, the first replica may be automatically selected (e.g., based on a lowest workload). In some embodiments, the version of the data set may be created by creating a snapshot or other image of a data volume, file, or other data set data that represents the state of the data set at the point in time. In some embodiments, an older snapshot or other version of the data set may be obtained and then updated based on an update log (which may record updates to the data set) to create the data set version at the point in time. In some embodiments, the point in time may be determined according to the time of the request to add the database (or may be specified by the request). In some embodiments, an amount of work to create, transfer, and update various snapshots may be determined (e.g., according to an amount of time elapsed since creation/storage and the number of received updates) in order to select a point in time for snapshot generation according to the amount of work (e.g., selecting a snapshot with a lowest determined amount of work). As part of generating the version of the data set, various optimizations may be implemented, including removing tombstone records for deleted data that occurred prior to the point in time (as discussed above with regard to FIG. 3) so that no tombstone record is included in the version of the data set that is generated.

As indicated at 530, those client updates to the data set that were performed at the first replica that occurred after the point in time are replicated to the new replica, in various embodiments. In various embodiments, other client updates to the data set that were performed at a second replica of the data set and replicated to the first replica are replicated from the first replica to the new replica, as indicated at 540. In at least some embodiments, these other client updates that were not included in the version of the data set are copied to the new replica. As indicated at 550, further updates to the data set performed at the second replica to the new replica that occur after the point in time may be replicated to the new replica from the second replica, in some embodiments.

As indicated at 560, the new replica may be made available for subsequent client updates, in some embodiments. For example, a request router for storage nodes storing the new replica may begin allowing or accepting access requests. In some embodiments, the new replica may be made available after the version of the data set is copied to the new replica, even if other updates have not been (or not completely) replicated.

Consider an example using regions as discussed above. Region A may be responsible for sending a new region N all writes with timestamps earlier than T and may be responsible for detecting delete-write conflicts for any such writes. Most writes with a timestamp earlier than T will be included in the snapshot that is sent to region N, but some writes may be later, as they may be received from other regions with timestamps earlier than T. These writes may be forwarded by region A to region N. Since region A may have a complete set of tombstones, it will detect any delete-write conflicts on behalf of region N; Region A may then only send to region N a delete or write that wins in such a conflict. In such an example scenario, no tombstones need to be ever sent from region A (or any other region). All regions may be responsible for sending to N any writes with timestamps later than T.

In a further example, item k with timestamp "42" may have been deleted in region A producing a tombstone with timestamp "100", and, concurrently, this item may have been updated in region B at timestamp "90." Time T may be selected as "120." The snapshot taken in region A may not contain item k since region A may have deleted item k before the snapshot was taken. Region B may not send its update to region N because the timestamp is less than "120". There are two cases, either region A received the update from B before or after when the snapshot was taken. If before the snapshot, then the update may be ignored and the backup correctly does not contain the item. If received after the snapshot, then the update may be ignored since it contains a timestamp that is earlier than the tombstone at A.

Various embodiments implementing the technique described in the example above may provide a correct, simple, and efficient technique for adding a replica as replica N is sent no tombstones and sent writes from A, B, or C only once. The correctness may not depend on the time T that is chosen. Replication of writes from other regions received at region A can be halted once region A knows that it will never receive writes from B or C with a timestamp less than T. This can be determined by asking regions B and C about their minimum timestamp, or by forwarding writes for a conservative period of time, say one week, in various embodiments. Note that there may be no cost for forwarding writes if no writes actually arrive with old timestamps, as the "with timestamp greater than T" check can be ignored once a region knows that it will never generate a timestamp less than T.

Consider another example scenario with delete-write conflicts involving one timestamp earlier than T and one later than T. Replica A may detect such conflicts. Suppose that the delete has the later timestamp. In this case, the delete may be sent to region N by whichever region in which the delete originated. Region N may then delete the item and maintain a tombstone. The write with an earlier timestamp may be sent to N by A and may either be ignored or deleted. Alternatively, suppose that the write has the later timestamp. In this case, the write may win and it does not matter whether region N every sees the delete. If the delete was performed in region A before the snapshot, then the item may not be present in the snapshot, and it may be recreated when N receives the write from some other region. If the delete arrives at A after the snapshot, it may be sent to region N but ignored or overwritten by the write.

Figure 6:
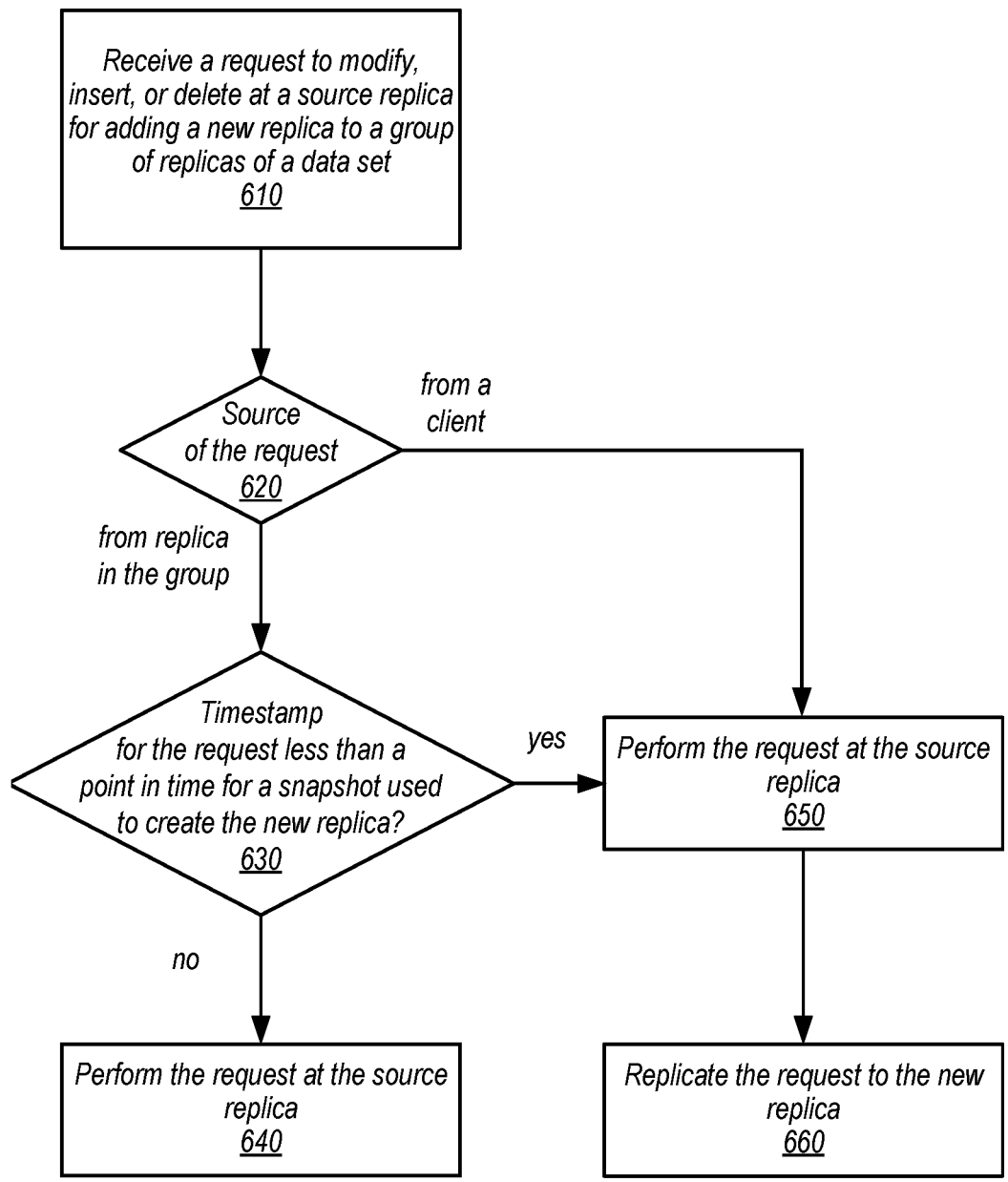
FIG. 6 is a high-level flowchart illustrating various methods and techniques to implement replicating updates from a source replica of a replica group, according to some embodiments.

To implement various ones of the example techniques discussed above, a region or other replica that is the source replica for adding a new replica to a replica group may implement features to handle requests from both a client of the source replica and replication updates from other replicas in the replica group. FIG. 6 is a high-level flowchart illustrating various methods and techniques to implement replicating updates from a source replica of a replica group, according to some embodiments. As indicated at 610, a request may be received to modify, insert, or delete at a source replica for adding a new replica to a group of replicas of a data set, in various embodiments. As indicated at 620, a source of the request may be determined, as from a client or a replica in the group. If from a client, then the request may be performed at the source replica 650 and replicated to the new replica, as indicated at 660. If from a replica group, then determine whether the timestamp for the request is less than a point in time for a snapshot used to create the new replica, as indicated at 630. If no, then ignore the request, as indicated at 640. If yes, then the request may be performed at the source replica 650 and replicated to the new replica, as indicated at 660.

Figure 7:
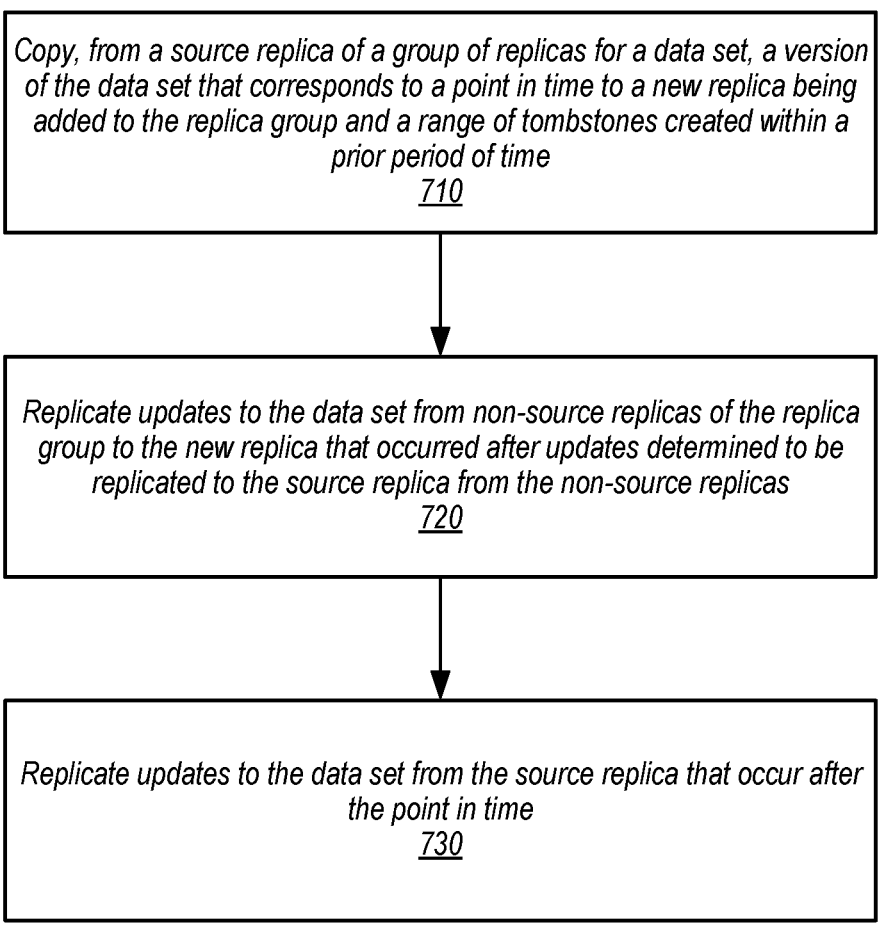
FIG. 7 is a high-level flowchart illustrating various methods and techniques to implement determining a range of tombstones in a prior time to replicate to a new replica, according to some embodiments.

While tombstones or other indications of deleted items may not be utilized in some techniques, as discussed above, in other techniques, select tombstones may be sent to implement other types of techniques for adding replicas to a multi-leader replica group for a data set. For example, FIG. 7 is a high-level flowchart illustrating various methods and techniques to implement determining a range of tombstones in a prior time to replicate to a new replica, according to some embodiments. As indicated at 710, a version of a data set that corresponds to a point in time to a new replica being added to a replica group may be copied, from a source replica of a group of replicas for a data set and a range of tombstones created within a prior period of time, in various embodiments. For instance, the tombstones created within the prior time period may be a time window sufficient to account for any conflict detection between writes and deletes to be consistently resolved (e.g., a 24 hour window so that writes or deletes may be guaranteed to be replicated amongst the replicas of a group within the time period). In scenarios where it may be difficult or costly to remove tombstones at the time of snapshot generation, such as a technique as utilizing the prior time period of tombstones may avoid costly calculations to remove (or determine a more specific set) of tombstones before copying the snapshot).

As indicated at 720, updates to the data set may be replicated from non-source replicas of the replica group to the new replica that occurred after updates determined to be replicated to the source replica from the non-source replicas, in some embodiments. For example, replication techniques similar to those discussed above with regard to FIGS. 3 - 5 may be implemented to send updates performed at the non-source replicas using a replication protocol and/or replication service or system. Similarly, as indicated at 730, updates to the data set may be replicated from the source replica that occur after the point in time, in some embodiments. Because the tombstones from the prior time period are sent to the new replica, conflict detection and resolution techniques similar to those discussed above (e.g., regarding regions A, B, and C) may be applied at the new replica.

Figure 8:
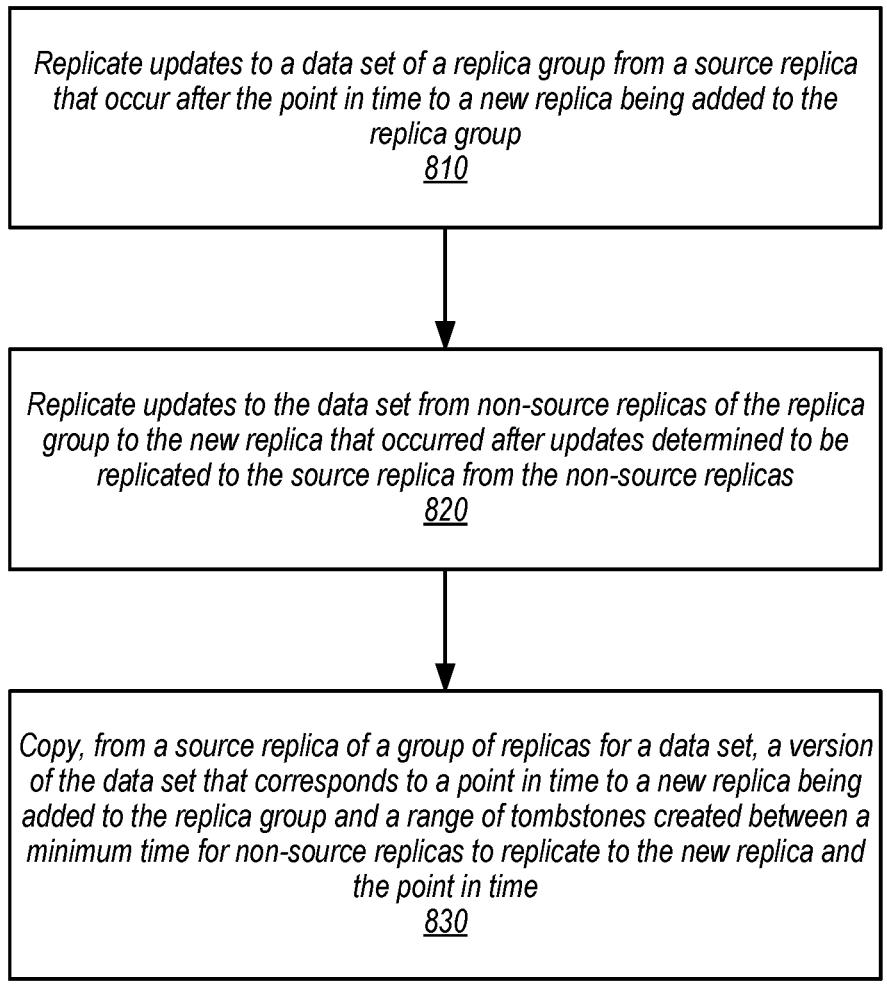
FIG. 8 is a high-level flowchart illustrating various methods and techniques to implement determining a range of tombstones to replicate to a new replica, according to some embodiments.

More selective techniques for reducing the number of tombstones sent may be implemented, in some embodiments. For example, FIG. 8 is a high-level flowchart illustrating various methods and techniques to implement determining a range of tombstones to replicate to a new replica, according to some embodiments. As indicated at 810, updates to a data set of a replica group may be replicated from a source replica that occur after a point in time to a new replica being added to the replica group, in some embodiments. For instance, the point in time may correspond to the time at which the new replica is created. As indicated at 820, updates to the data set from non-source replicas of the replica group may be replicated to the new replica that occurred after updates determined to be replicated to the source replica from the non-source replicas, in some embodiments. For example, an acknowledgement or record of success updates replicated to other replicas in the replica group may be maintained for each replica so that non-source replicas can identify what is the lowest timestamp for updates that are determined to be replicated to the source replica, in some embodiments. As discussed above with regard to FIG. 8, replication techniques similar to those discussed above with regard to FIGS. 3 - 5 may be implemented to send updates performed at the non-source replicas using a replication protocol and/or replication service or system.

As indicated at 830, copy, from a source replica of a group of replicas for a data set, a version of the data set that corresponds to a point in time to a new replica being added to the replica group and a range of tombstones created between a minimum time for non-source replicas to replicate to the new replica and the point in time. For example, the minimum time may be determined as the lowest of the different timestamps determined above at 820, so that the range of tombstones may be limited to those needed to handle conflicts for updates being replicated to the new replica by the non-source replicas.

Figure 9:
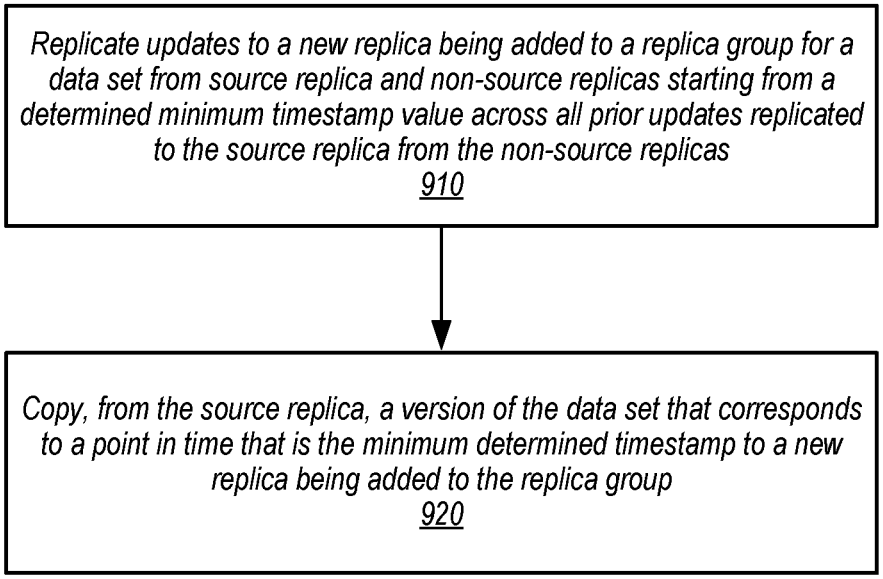
FIG. 9 is a high-level flowchart illustrating various methods and techniques to implement replicating data to a new replica according to a minimum timestamp, according to some embodiments.

FIG. 9 is a high-level flowchart illustrating various methods and techniques to implement replicating data to a new replica according to a minimum timestamp, according to some embodiments. As indicated at 910, updates to a new replica being added to a replica group for a data set may be replicated from source replica and non-source replicas starting from a determined minimum timestamp value across all prior updates replicated to the source replica from the non-source replicas, in some embodiments. For example, similar to the determination at element 830 in FIG. 8, a minimum timestamp of the individually determined timestamps for non-source replicas may be determined as the timestamp from which all replicas will replicate updates to the new replica. In this way, tombstones with higher timestamps than the minimum value are replicated (as updates) to the new replica. As indicated at 920, a version of the data set that corresponds to a point in time that is the minimum determined timestamp may be copied from the source replica to the new replica being added to the replica group, in some embodiments.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 10:
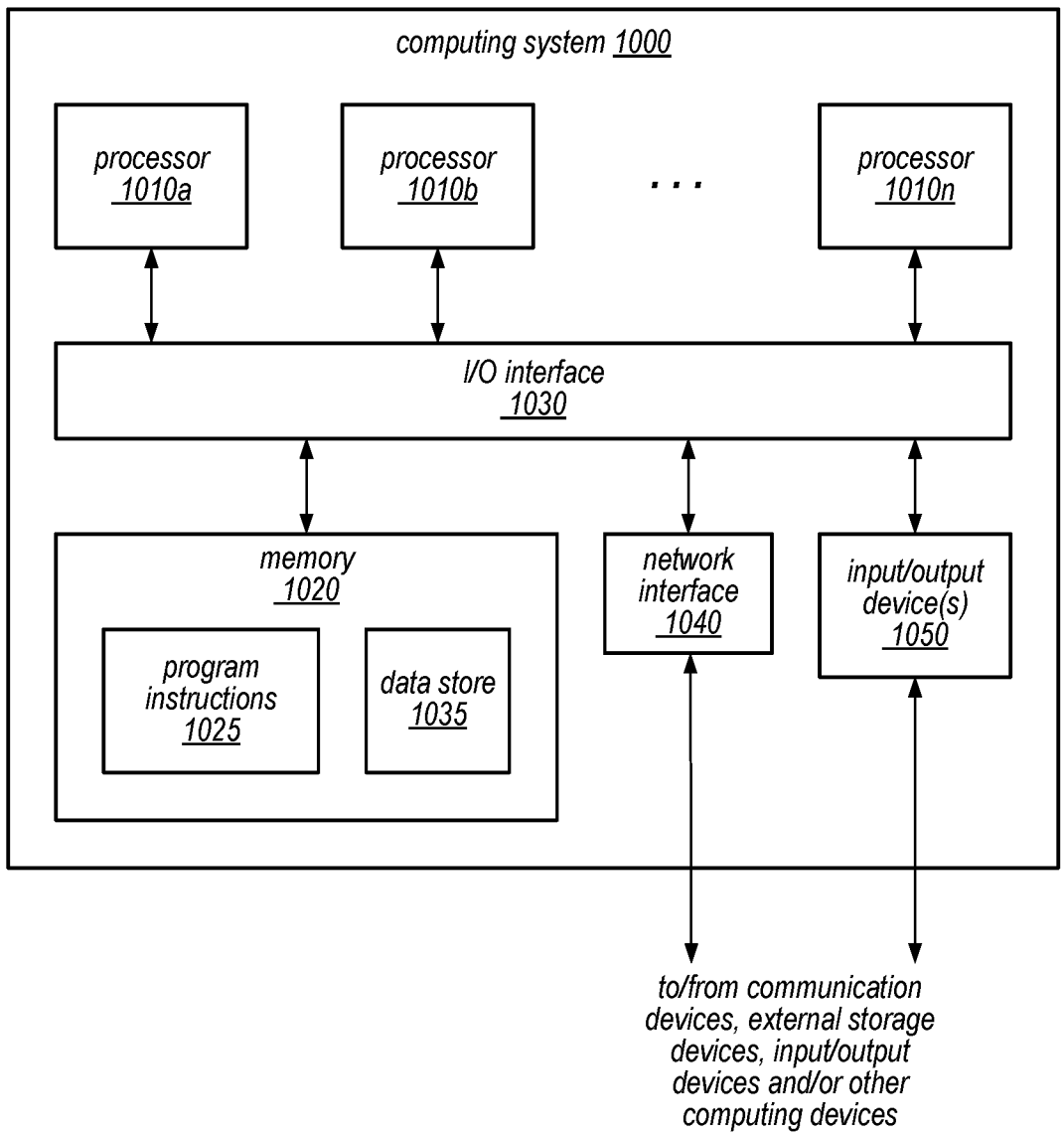
FIG. 10 is a block diagram illustrating an example computing system, according to some embodiments.

Embodiments to implement adding replicas to a multi-leader replica group for a data set as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in one embodiment. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1020 may store program instructions 1025 and/or data accessible by processor 1010, in one embodiment. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in one embodiment.

In one embodiment, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in one embodiment. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in one embodiment. Multiple input/output devices 1050 may be present in computer system 1000 or may be distributed on various nodes of computer system 1000, in one embodiment. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, that implement the various embodiments of the systems as described herein, and data store 1035, comprising various data accessible by program instructions 1025, in one embodiment. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
 a plurality of computing devices, wherein each computing device of the plurality of computing devices comprises a memory and at least one processor for implementing a database service, and wherein, to implement the database service, the memory and the at least one processor of each computing device of the plurality of computing devices are configured to:
  add a new replica of a database table to a group of replicas of the database table that replicate received client updates performed at individual replicas in the group of replicas to other replicas in the group of replicas to maintain eventual consistency between the replicas of the group of replicas, wherein to add the new replica, the database service is configured to:
   copy, from a first replica of the group of replicas and to the new replica, a snapshot of the database table that corresponds to a point in time;
   send, from the first replica and to the new replica, additional client updates to the database table, wherein the additional client updates to the data table are performed at the first replica and occur after the point in time of the copied snapshot;
   send, from the first replica and to the new replica, other client updates to the database table that were performed at a second replica of the database table and replicated to the first replica, wherein the other client updates occurred before the point in time of the copied snapshot and were not included in the snapshot copied to the new replica, and wherein the other client updates are based on a last write wins conflict scheme, performed at the new replica, to resolve, at the new replica, two or more other client updates that are conflicting;
   send, from the second replica and to the new replica, further updates to the database table performed at the second replica and that occur after the point in time of the copied snapshot; and
  after copying the snapshot of the database table to the new replica, allow access requests to the new replica of the database table.

2. The system of claim 1, wherein the database service is further configured to add the new replica in response to receipt of a request via an interface of the database service from a client of the database service to add the new replica.

3. The system of claim 1, wherein to add the new replica to the group of replicas of the database table, the database service is configured to send indications of deletions in the data set that occurred within a determined range of time before the point in time of the copied snapshot from the first replica to the new replica.

4. The system of claim 1, wherein to add the new replica the database service is further configured to select the first replica from the replica group to be a source replica according to a workload of the first replica.

5. The system of claim 1, wherein the database service is implemented across a plurality of different provider network regions, wherein the first replica of the database table is in a first region of the plurality of provider network regions, the second replica of the database table is in a second region of the plurality of provider network regions, and the new replica of the database table is in a third region of the plurality of provider network regions.

6. A method, comprising:
adding a new replica to a group of replicas of a data set that replicate received client updates performed at individual replicas in the group of replicas to other replicas in the group of replicas, wherein adding the new replica comprises:
copying, from a first replica of the group of replicas and to the new replica, a version of the data set that corresponds to a point in time;
replicating, from the first replica and to the new replica, additional client updates to the data set, wherein the additional client updates to the data set are performed at the first replica and occur after the point in time of the copied version of the data set;
replicating, from the first replica and to the new replica, other client updates to the data set that were performed at a second replica of the data set and replicated to the first replica, wherein the other client updates occurred before the point in time of the copied version of the data set and were not included in the version of the data set copied to the new replica, wherein the other client updates are based on a last write wins conflict scheme, performed at the new replica, to resolve, at the new replica, two or more other client updates that are conflicting;
replicating, from the second replica and to the new replica, further updates to the data set performed at the second replica and that occur after the point in time of the copied version of the data set; and
after copying the version of the data set to the new replica, making the new replica available for subsequent client updates.

7. The method of claim 6, wherein replicating the other client updates to the data set to the new replica that were performed at a second replica of the data set and replicated to the first replica to the new replica comprises comparing a timestamp for updates received from the second replica with the point in time, wherein updates with a timestamp less than the point in time of the copied version of the data set are the other client updates.

8. The method of claim 6, wherein copying the version of the data set that corresponds to a point in time to the new replica comprises not including indications of deletions in the data set that occurred before the point in time of the copied version of the data set.

9. The method of claim 6, wherein the adding the new replica is performed in response to receiving a request to add the new replica.

10. The method of claim 9, wherein the method further comprises selecting the point in time for the version of the data set according to a determined amount of workload to generate the version of the data set according to the point in time of the copied version of the data set.

11. The method of claim 6, wherein adding the new replica further comprises selecting the first replica from the replica group to be a source replica according to a workload of the first replica.

12. The method of claim 6, further comprising adding at least one other new replica to the replica group at least partially during the adding of the new replica.

13. The method of claim 12, further comprising:
determining that adding the at least one other new replica to the replica group is within an add limit for adding replicas to the replica group; and
wherein the adding the at least one other new replica to the replica group is performed after determining that adding the at least one other new replica to the replica group is within the add limit for adding replicas to the replica group.

14. The method of claim 6, wherein adding the new replica further comprises sending indications of deletions in the data set that occurred within a determined range of time before the point in time of the copied version of the data set from the first replica to the new replica.

15. The method of claim 6, wherein the replication amongst the group of replicas maintains eventual consistency for the data set amongst the replicas of the group.

16. One or more non-transitory, computer-readable storage media, storing program instructions that when executed on or across one or more computing devices cause the one or more computing devices to implement:
adding a new replica to a group of replicas of a data set that replicate received client updates performed at individual replicas in the group of replicas to other replicas in the group of replicas, wherein adding the new replica comprises:
causing copying, from a first replica of the group of replicas and to a new replica, a version of the data set that corresponds to a point in time;
causing replication, from the first replica and to the new replica, additional client updates to the data set, wherein the additional client updates to the data set are performed at the first replica and occur after the point in time of the copied version of the data set;
causing replication, from the first replica and to the new replica, other client updates to the data set that were performed at a second replica of the data set and replicated to the first replica, wherein the other client updates occurred before the point in time of the copied version of the data set and were not included in the version of the data set copied to the new replica, and wherein the other client updates are based on a last write wins conflict scheme, performed at the new replica, to resolve, at the new replica, one or more other client updates that are conflicting;
causing replication, from the second replica and to the new replica, further updates to the data set performed at the second replica and that occur after the point in time of the copied version of the data set; and
after copying the version of the data set to the new replica, making the new replica available for subsequent client updates.

17. The one or more non-transitory, computer-readable storage media of claim 16, wherein the adding the new replica is performed in response to receiving a request to add the new replica.

18. The one or more non-transitory, computer-readable storage media of claim 16, wherein the adding the new replica is performed in response to determining that one or more criteria for automatically adding the new replica to the replica group is satisfied.

19. The one or more non-transitory, computer-readable storage media of claim 16, wherein, in adding the new replica the program instructions cause the one or more computing devices to implement sending indications of deletions in the data set that occurred within a determined range of time before the point in time of the copied version of the data set from the first replica to the new replica.

20. The one or more non-transitory, computer-readable storage media of claim 16, wherein the data set is a database table stored as part of a database service, wherein the first replica is implemented as part of a first provider network region, wherein the second replica is implemented as part of a second provider network region, and wherein the new replica is implemented as part of a third provider network region.

* * * * *